(12) United States Patent
Wang et al.

(10) Patent No.: US 9,083,485 B2
(45) Date of Patent: Jul. 14, 2015

(54) DEFRAGMENTATION OF OPTICAL NETWORKS

(75) Inventors: Xi Wang, Murphy, TX (US); Inwoong Kim, Allen, TX (US); Paparao Palacharla, Richardson, TX (US); Motoyoshi Sekiya, Richardson, TX (US)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 13/445,756

(22) Filed: Apr. 12, 2012

(65) Prior Publication Data
US 2013/0272710 A1 Oct. 17, 2013

(51) Int. Cl.
*H04J 14/02* (2006.01)
*H04J 14/00* (2006.01)

(52) U.S. Cl.
CPC .......... *H04J 14/0256* (2013.01); *H04J 14/0257* (2013.01); *H04J 14/026* (2013.01); *H04J 14/0212* (2013.01); *H04J 14/0298* (2013.01)

(58) Field of Classification Search
CPC ... H04J 14/0257; H04J 14/0227; H04J 14/02; H04J 14/0204; H04J 14/0205; H04J 14/021; H04J 14/0256; H04J 14/026; H04J 14/0267; H04J 14/0275; H04J 14/0298; H04J 2203/0067; H04J 14/0241; H04J 14/0284; H04J 3/0638; H04J 14/0212; H04J 3/1611; H04J 3/1682; H04J 14/00; H04J 14/0213; H04J 14/0221; H04J 14/0238; H04J 14/0254; H04J 14/0279; H04J 14/028
USPC .................. 398/58, 66, 68, 69, 43–57, 79–97
See application file for complete search history.

(56) References Cited

U.S. PATENT DOCUMENTS

| | | | | |
|---|---|---|---|---|
| 5,838,687 | A * | 11/1998 | Ramfelt | 370/443 |
| 6,859,623 | B2 * | 2/2005 | Le Bouette et al. | 398/94 |
| 7,317,728 | B2 * | 1/2008 | Acharya et al. | 370/395.51 |
| 7,397,815 | B2 * | 7/2008 | Gupta et al. | 370/458 |
| 7,450,516 | B1 * | 11/2008 | Cortez et al. | 370/238 |
| 7,822,343 | B2 * | 10/2010 | Song et al. | 398/58 |
| 8,023,527 | B2 * | 9/2011 | Sun et al. | 370/458 |
| 8,213,796 | B2 * | 7/2012 | Krimmel | 398/66 |
| 8,456,983 | B2 * | 6/2013 | Luo | 370/225 |
| 2002/0191249 | A1 * | 12/2002 | Orbach et al. | 359/127 |
| 2004/0165540 | A1 * | 8/2004 | Acharya et al. | 370/252 |
| 2006/0239272 | A1 * | 10/2006 | Heidari-Bateni et al. | 370/395.21 |
| 2008/0298805 | A1 * | 12/2008 | Lee et al. | 398/48 |

(Continued)

OTHER PUBLICATIONS

Yu et al, Spectrum compactness based Defragmentation in Flexible Bandwidth Optical Networks, Jan. 2012, OFC/NFOEC, pp. 1-3.*

(Continued)

*Primary Examiner* — Ken Vanderpuye
*Assistant Examiner* — Dibson Sanchez
(74) *Attorney, Agent, or Firm* — Maschoff Brennan

(57) ABSTRACT

According to an aspect of an embodiment, a method of spectrum defragmentation in an optical network may include assigning an optical signal within an optical network to a first frequency slot that spans a first portion of an optical spectrum of the optical network. The method may also include constructing a frequency slot dependency map based on the assignation of the optical signal to the frequency slot. The method may also include reassigning, as a result of an optical signal departure event, the optical signal to a second frequency slot based on the frequency slot dependency map. The second frequency slot may span a second portion of the optical spectrum of the optical network.

19 Claims, 8 Drawing Sheets

(56) References Cited

U.S. PATENT DOCUMENTS

| | | | |
|---|---|---|---|
| 2009/0087180 A1* | 4/2009 | Allen | 398/45 |
| 2010/0028006 A1* | 2/2010 | Guy et al. | 398/79 |
| 2010/0220998 A1* | 9/2010 | Sekiya | 398/34 |
| 2012/0201541 A1* | 8/2012 | Patel et al. | 398/58 |
| 2012/0224851 A1* | 9/2012 | Takara et al. | 398/45 |
| 2012/0237212 A1* | 9/2012 | Nishihara et al. | 398/26 |
| 2012/0301141 A1* | 11/2012 | Sakamoto et al. | 398/48 |
| 2012/0321296 A1* | 12/2012 | Wellbrock et al. | 398/5 |
| 2012/0321306 A1* | 12/2012 | Wellbrock et al. | 398/48 |
| 2012/0328286 A1* | 12/2012 | Wang et al. | 398/34 |
| 2012/0328296 A1* | 12/2012 | Sullivan et al. | 398/79 |
| 2013/0195460 A1* | 8/2013 | Kadohata et al. | 398/79 |
| 2013/0266316 A1* | 10/2013 | Xia et al. | 398/48 |

OTHER PUBLICATIONS

Jinno et al , Distance Adaptive Spectrum Resource Allocation in Spectrum Sliced Elastic Optical Path Network, Feb. 2012, IEEE Magazine, vol. 48 Issue 8, pp. 138-145.*

Cugini et al , Push and Pull Technique for Defragmentation in Flexible Optical Networks, Jan. 2012, OFC/NFOEC, pp. 1-3.*

Patel et al, Defragmentation of Transparent Flexible Optical WDM (FWDM) Networks, Mar. 2011, OFC/NFOEC, pp. 1-3.*

Gerstel et al, Elastic Optical Networking a New Dawn for the Optical Layer, Feb. 2012, IEEE, pp. s12-s20.*

Patel et al, Survivable transparent Flexible optical WDM (FWDM) networks, Mar. 2011, IEEE, pp. 1-3.*

Castro et al, Dynamic routing and spectrum (re)allocation in future flexgrid optical networks, May 9, 2012, Computer Network, 2869-2883.*

Sone et al., "Routing and Spectrum Assignment Algorithm Maximizes Spectrum Utilization in Optical Networks", ECOC Technical Digest, 2011 OSA, Mo.1.K.3, pp. 1-3.

Takagi et al., "Disruption Minimized Spectrum Defragmentation in Elastic Optical Path Networks that Adopt Distance Adaptive Modulation", ECOC Technical Digest, 2011 OSA, Mo.2.K.3, pp. 1-3.

Wen et al., "Dynamic On-demand Lightpath Provisioning Using Spectral Defragmentation in Flexible Bandwidth Networks", ECOC Technical Digest, 2011 OSA, Mo.2.K.4, pp. 1-3.

Kadohata et al., "Wavelength Path Reconfiguration to Reduce Fragmentation and Number of Operations in WDM Mesh Networks", ECOC Technical Digest, 2011 OSA, Mo.2.K.5, pp. 1-3.

* cited by examiner

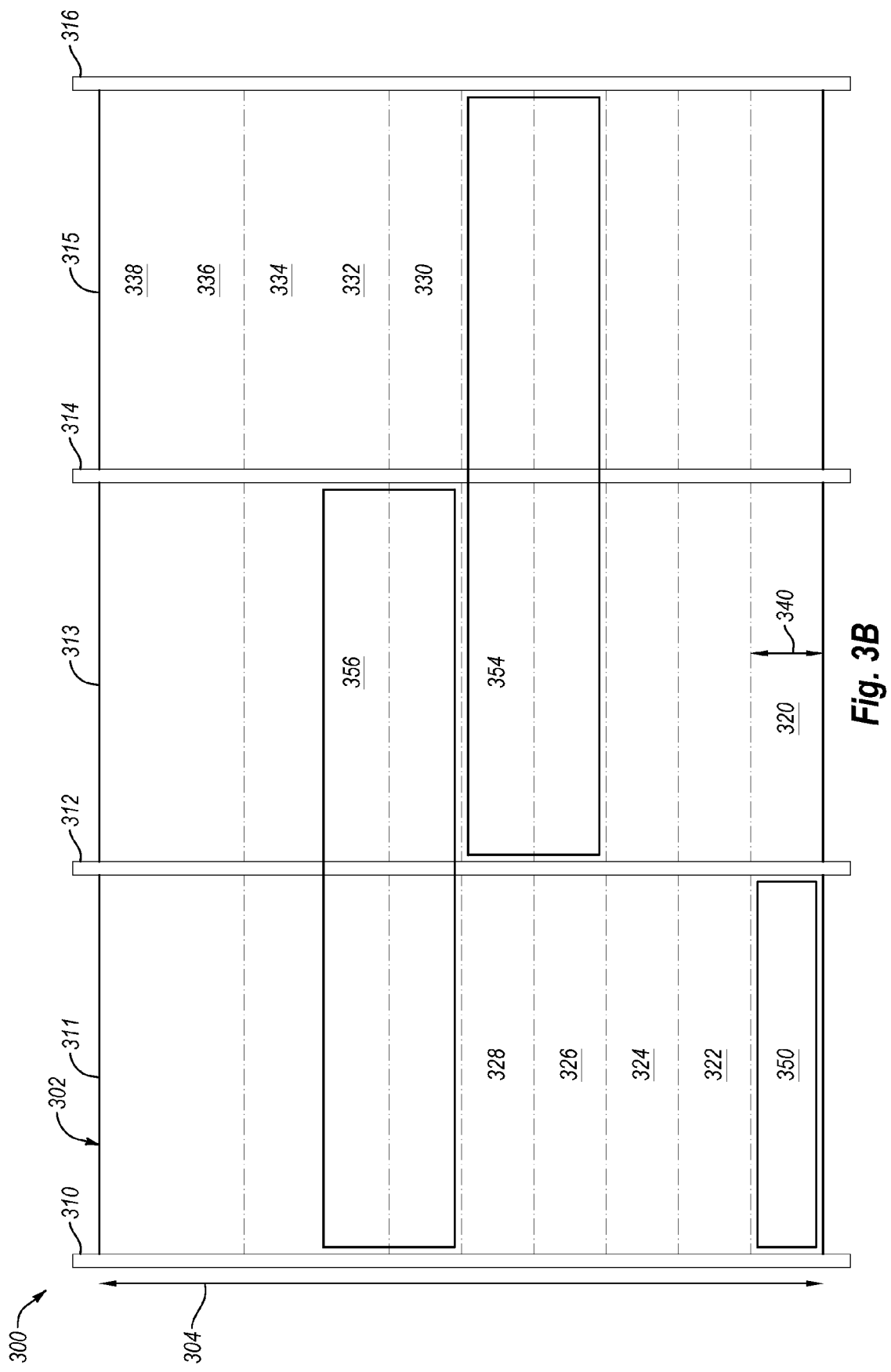

US 9,083,485 B2

DEFRAGMENTATION OF OPTICAL NETWORKS

FIELD

The embodiments discussed herein are related to optical networks.

BACKGROUND

Some optical networks may use wavelength-division multiplexing to multiplex multiple optical signals onto a single optical fiber. The different optical signals may use different carrier wavelengths of light to carry their respective signals within a respective frequency channel in the single optical fiber. For example, a single optical fiber may contain eight different frequency channels, each corresponding to a different one of eight optical signals.

In some circumstances, the optical bandwidths of the frequency channels may also be adjustable. In these circumstances, the optical bandwidths of the frequency channels may be adjusted depending on the signal rate of the optical signal and other factors. With varying sizes of frequency channels and varying placement of the frequency channels within an optical spectrum of an optical network, the optical spectrum may become fragmented. Fragmentation of an optical spectrum of an optical network may lead to a decrease in the efficiency of the optical network's ability to transmit data.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of spectrum defragmentation in an optical network may include assigning an optical signal within an optical network to a first frequency slot that spans a first portion of an optical spectrum of the optical network. The method may also include constructing a frequency slot dependency map based on the assignation of the optical signal to the frequency slot. The method may also include reassigning, as a result of an optical signal departure event, the optical signal to a second frequency slot based on the frequency slot dependency map. The second frequency slot may span a second portion of the optical spectrum of the optical network.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 3A-3C illustrate defragmentation of an example optical spectrum of an optical network.

DESCRIPTION OF EMBODIMENTS

Some embodiments described herein include a method of spectrum defragmentation in an optical network. In some embodiments, the method may include assigning an optical signal within an optical network to a first frequency slot that spans a first portion of an optical spectrum of the optical network. A frequency slot dependency map may be constructed based on the assignation of the optical signal to the frequency slot. After the occurrence of an optical signal departure event, such as the optical network dropping one of the optical signals within the network, the optical signal may be reassigned to a second frequency slot based on the frequency slot dependency map. The second frequency slot may span a second portion of the optical spectrum of the optical network. Reassigning the optical signal to the second frequency slot within the optical network may assist in defragmenting the optical spectrum of the optical network. Additionally, the optical signals may be reassigned to the second frequency slot with limited or no service disruption of the optical signal or optical network.

Embodiments of the present invention will be explained with reference to the accompanying drawings.

Figure 1:
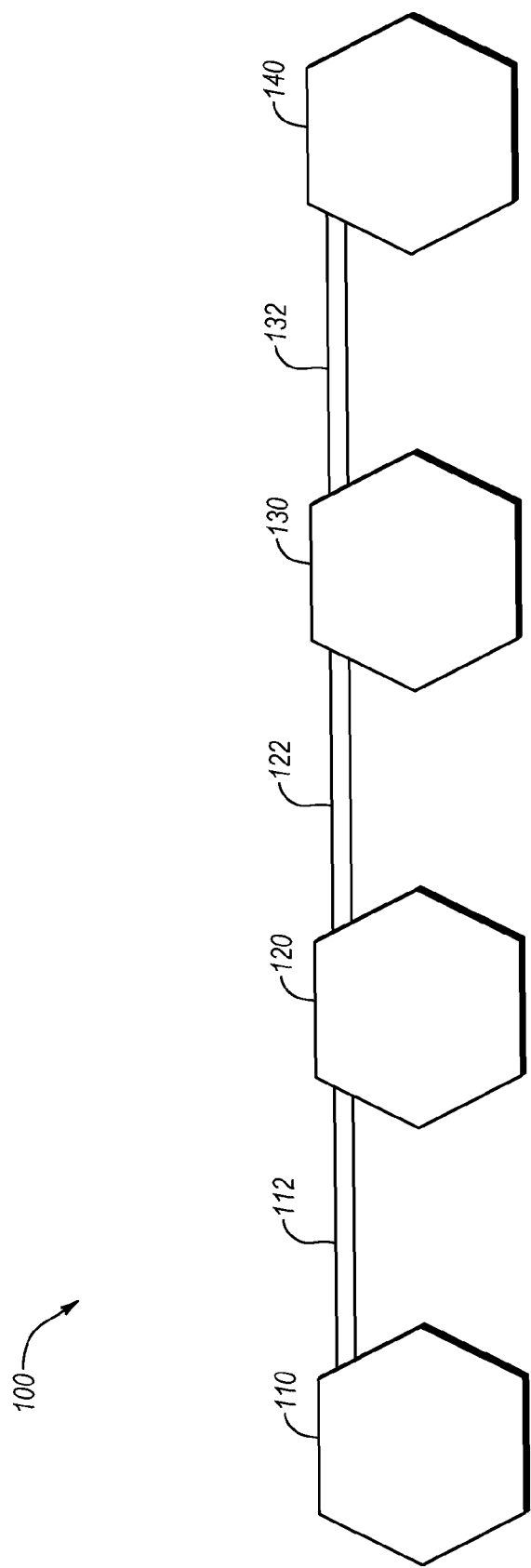
FIG. 1 is a block diagram of an example optical network.

FIG. 1 is a block diagram of an example optical network 100, arranged in accordance with at least some embodiments described herein. The optical network 100 includes, but is not limited to, optical nodes 110, 120, 130, 140 with the optical node 110 coupled to the optical node 120 by an optical link 112, the optical node 120 coupled to the optical node 130 by an optical link 122, and the optical node 130 coupled to the optical node 140 by an optical link 132. Although the optical network 100 is shown as a point-to-point optical network, the optical network 100 may be configured as a ring optical network, a mesh optical network, or any other optical network or combination of networks. The optical network 100 may be used as a short-haul network, a long-haul network, or any other optical network or combination of optical networks. The optical network 100 may also have more or less optical nodes, and/or other optical components than those illustrated in FIG. 1.

The optical nodes 110, 120, 130, 140 may be source nodes, destination nodes, pass-through nodes, or some combination thereof. For example, in some embodiments, the optical node 130 may source an optical signal to optical node 140, receive an optical signal from the optical node 110, and be a pass-through node for an optical signal sent by the optical node 120 to the optical node 140.

The optical nodes 110, 120, 130, 140 may also include one or more optical components, such as, wavelength selective switches (WSS), optical transceivers, optical transponders, optical splitters, optical filters, tunable optical variable-bandwidth wavelength selective switch (VB-WSS), optical amplifier, or other optical components.

Each optical signal transmitted through the optical network 100 may use a portion of the optical spectrum of the optical network 100. More specifically, each optical signal may span a portion of the optical spectrum of the optical network 100. The bandwidth of the optical signal may depend on one or more factors, such as the data rate of the optical signal, the distance to be traveled by the optical signal, the modulation format of the optical signal, among others. As an example, an optical signal with a data rate of 100 gigabytes per second may use 50 gigahertz of optical spectrum while an optical signal with a data rate of 400 gigabytes per second may use 87.5 gigahertz of optical spectrum.

The optical spectrum of the optical network 100 may be allocated to an optical signal based on the optical spectrum requirements of the optical signal. To allocate the optical spectrum, the optical spectrum may be broken into frequency slots of a predetermined optical bandwidth. An optical signal may be allocated sufficient frequency slots to meet the optical spectrum requirements of the optical signal. For example, if the bandwidth of each frequency slot is 12.5 gigahertz then an optical signal with an optical spectrum requirement of 50 gigahertz may be allocated four frequency slots.

Figure 2:
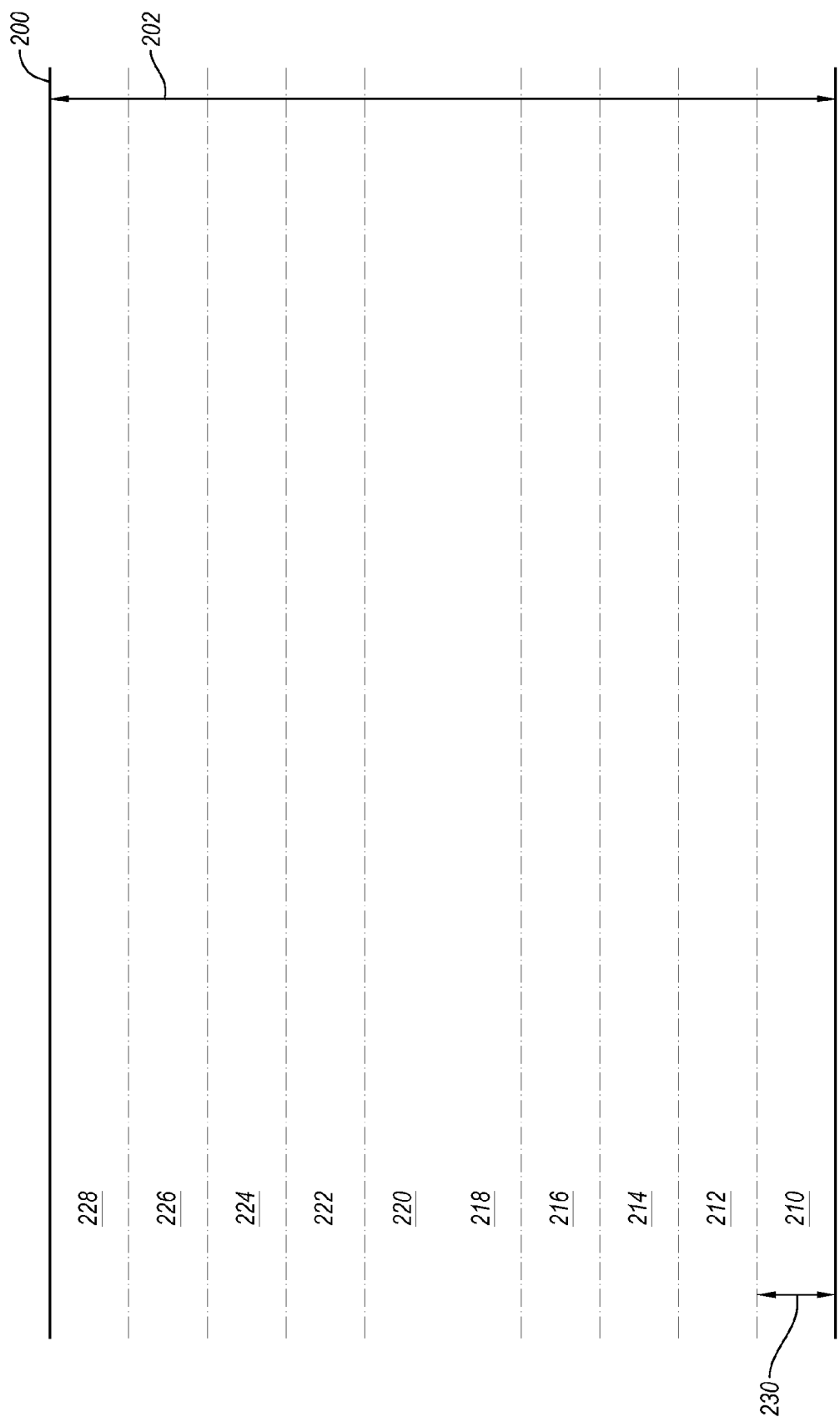
FIG. 2 illustrates an example optical spectrum of an optical network.

FIG. 2 illustrates an example optical spectrum 200 of an optical network, arranged in accordance with at least some embodiments described herein. The optical spectrum 200 has an optical bandwidth 202 and is divided into frequency slots 210, 212, 214, 216, 218, 220, 222, 224, 226, 228. Each of the frequency slots 210, 212, 214, 216, 218, 220, 222, 224, 226, 228 has an optical bandwidth 230 and spans a portion of the optical spectrum 200.

In some embodiments, the optical bandwidth 230 of each frequency slot 210, 212, 214, 216, 218, 220, 222, 224, 226, 228 may be the same and may be equal to the optical bandwidth 202 of the optical spectrum 200 divided by the number of frequency slots in the optical spectrum 200. For example, as illustrated in FIG. 2, the optical bandwidth 230 of each frequency slot 210, 212, 214, 216, 218, 220, 222, 224, 226, 228 may be one-tenth the optical bandwidth 202 of the optical spectrum 200 because the optical spectrum 200 is divided into ten frequency slots.

In some embodiments, the optical bandwidth 230 of each frequency slot 210, 212, 214, 216, 218, 220, 222, 224, 226, 228 may be different or some of the frequency slots 210, 212, 214, 216, 218, 220, 222, 224, 226, 228 may have the same optical bandwidths 230 while other frequency slots 210, 212, 214, 216, 218, 220, 222, 224, 226, 228 may have different optical bandwidths 230.

In some embodiments, all of the frequency slots 210, 212, 214, 216, 218, 220, 222, 224, 226, 228 within the optical spectrum 200 may be grouped together to provide optical bandwidth for an optical signal. In other embodiments, a subset of the frequency slots 210, 212, 214, 216, 218, 220, 222, 224, 226, 228 may be grouped together to provide optical bandwidth for an optical signal.

Figure 3A:
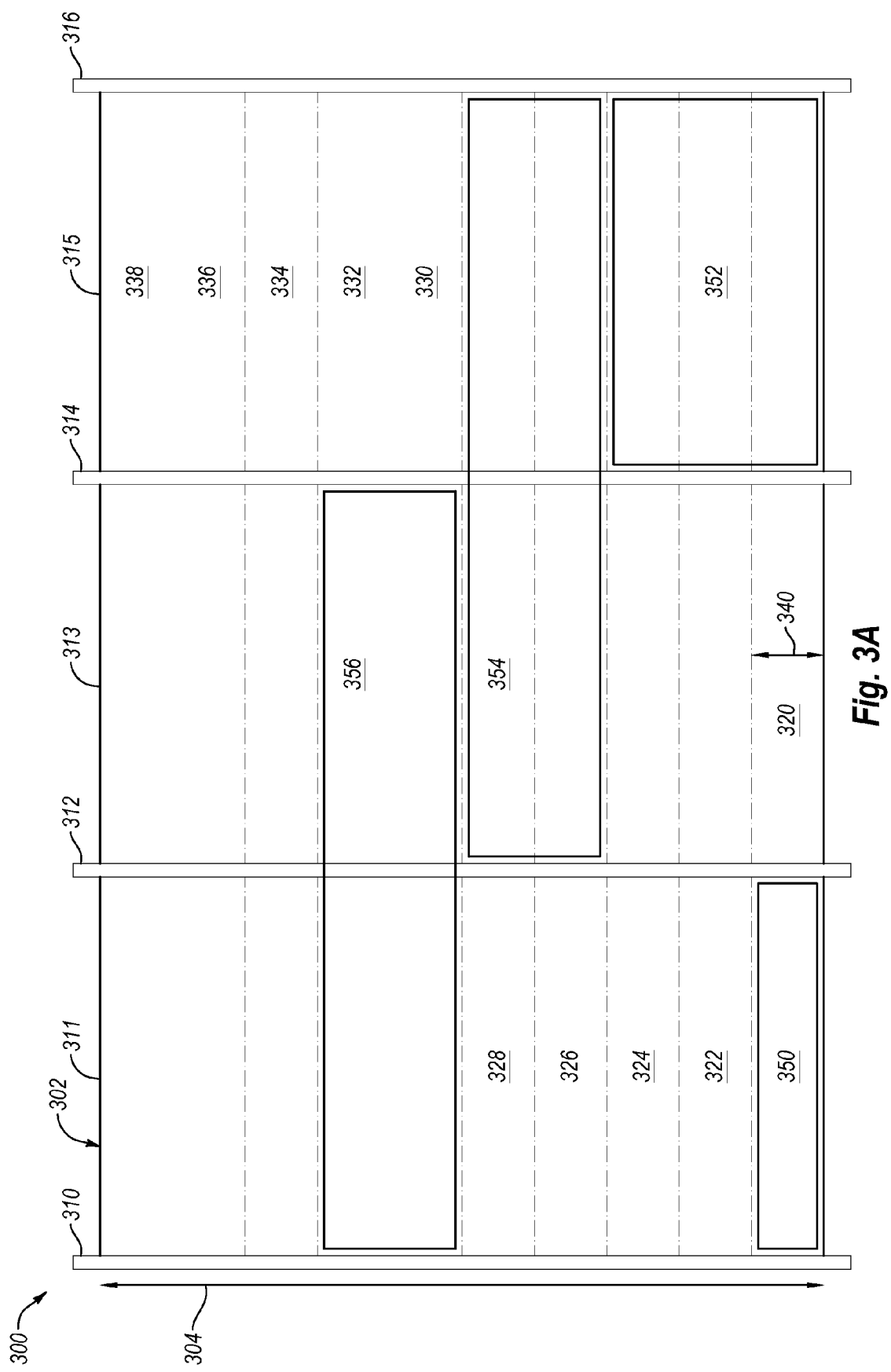
Figure 3C:
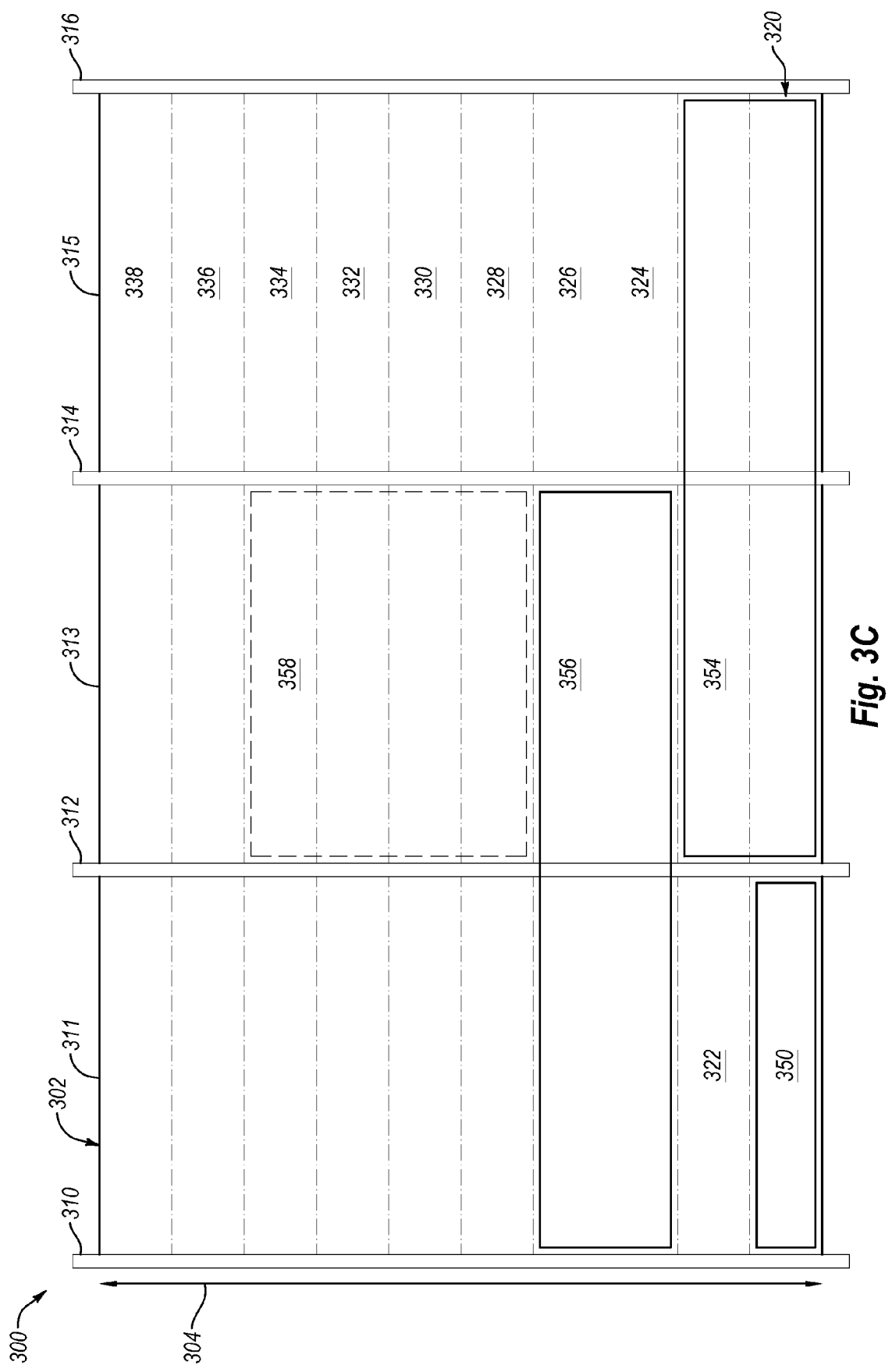

FIGS. 3A-3C illustrate defragmentation of an example optical spectrum 302 of an optical network 300, arranged in accordance with at least some embodiments described herein. The optical network 300 illustrated in FIGS. 3A-3C includes first, second, third, and fourth optical nodes 310, 312, 314, 316 with the first optical node 310 coupled to the second optical node 312 by a first optical link 311, the second optical node 312 coupled to the third optical node 314 by a second optical link 313, and the third optical node 314 coupled to the fourth optical node 316 by a third optical link 315. The first, second, third, and fourth optical nodes 310, 312, 314, 316 may be similar to the optical nodes 110, 120, 130, 140 illustrated in FIG. 1.

The optical spectrum 302 of the optical network 300 has an optical bandwidth 304. The optical spectrum 302 is divided into first, second, third, fourth, fifth, sixth, seventh, eighth, ninth, and tenth frequency slots 320, 322, 324, 326, 328, 330, 332, 334, 336, 338. Each of the frequency slots 320, 322, 324, 326, 328, 330, 332, 334, 336, 338 may have an optical bandwidth 340.

FIG. 3A illustrates first, second, third, and fourth optical signals 350, 352, 354, 356 supported by the optical network 100. The first optical signal 350 may be sourced by the first optical node 310 and may terminate at the second optical node 320. The first optical signal 350 may have an optical spectrum requirement that uses one frequency slot, including the first frequency slot 320.

The second optical signal 352 may be sourced by the third optical node 314 and may terminate at the fourth optical node 316. The second optical signal 352 may have an optical spectrum requirement that uses three frequency slots, including the first, second, and third frequency slots 320, 322, 324.

The third optical signal 354 may be sourced by the second optical node 312 and may terminate at the fourth optical node 316. The third optical signal 354 may have an optical spectrum requirement that uses two frequency slots, including the fourth and fifth frequency slots 326, 328.

The fourth optical signal 356 may be sourced by the first optical node 310 and may terminate at the third optical node 314. The fourth optical signal 356 may have an optical spectrum requirement that uses two frequency slots, including the sixth and seventh frequency slots 330, 332.

Optical signals within the optical network 300, such as the optical signals 350, 352, 354, 356 may be assigned to the frequency slots 320, 322, 324, 326, 328, 330, 332, 334, 336, 338 within the optical network 300 based on an algorithm. For example, in some embodiments, an optical signal may be assigned to the frequency slots 320, 322, 324, 326, 328, 330, 332, 334, 336, 338 based on a first-fit algorithm that searches for the first vacant contiguous frequency slots closest to a selected frequency slot that support the optical bandwidth requirements of the optical signal between the source and destinations optical nodes of the optical signal.

For example, in FIG. 3A, the first frequency slot 320 may be the selected frequency slot. When assigning the first optical signal 350, the first frequency slot 320 may be selected for the first optical signal 350 because it is the first vacant frequency slot between a source optical node, or the first optical node 310, and a destination optical node, or the second optical node 312, that is the closest frequency slot to the selected frequency slot (i.e. the first frequency slot 320). In a similar manner, the second optical signal 352 may be assigned to the first, second, and third frequency slots 320, 322, 324.

When assigning the third optical signal 354, the fourth and fifth frequency slots 326, 328 may be selected for the third optical signal 354 because they are the first vacant contiguous frequency slots between a source optical node, or the second optical node 312, and a destination optical node, or the fourth optical node 316, that are the closest to the selected frequency slot (i.e. the first frequency slot 320). In a similar manner, the fourth optical signal 356 may be assigned to the sixth and seventh frequency slots 330, 332.

In other embodiments, other algorithms may also be used to assign the optical signals to the frequency slots 320, 322, 324, 326, 328, 330, 332, 334, 336, 338.

Additional optical signals may also be supported by the optical network 300. For example, an optical signal may have a source and destination node of the first and third optical nodes 310, 314 respectively. If the optical signal has an optical bandwidth requirement of two or less frequency slots, then the optical signal may use the second and third frequency slots 322, 324. If the optical signal has an optical bandwidth requirement of four or more frequency slots, the optical signal may be block from the optical network 300 because there are not four contiguous frequency slots available between the first and third optical nodes 310, 314.

A frequency slot dependency map may be constructed based on the assignment of the optical signals 350, 352, 354, 356 to the frequency slots 320, 322, 324, 326, 328, 330, 332, 334, 336, 338. The frequency slot dependency map may associate groupings of one or more frequency slots assigned to different optical signals that depend on each other. More specifically, the frequency slot dependency map may associate groupings of frequency slots when a first grouping of frequency slots for a first optical signal causes a second grouping of frequency slots for a second optical signal to be separated from the selected frequency slot by one or more frequency slots.

For example, in embodiments that implement the first-fit algorithm as described above, the frequency slots for the third optical signal 354 are selected after the frequency slots for the second optical signal 352. In these and other embodiments, with the first frequency slot 320 as the selected frequency slot, the frequency slot dependency map may indicate that the frequency slots for the third optical signal 354 (i.e. the fourth and fifth frequency slots 326, 328 between the second and third optical nodes 312, 316) are associated with and dependent on the frequency slots for the second optical signal 352 (i.e. the first, second, and third frequency slots 320, 322, 324 between the third and fourth optical nodes 314, 316) because the frequency slots already assigned to the second optical signal 352 cause the frequency slots selected for the third optical signal 354 to be separated from and not include the selected frequency slot. Using the above analysis, the frequency slots for the fourth optical signal 356 (i.e. the sixth and seventh frequency slots 330, 332 between the first and second optical nodes 310, 314) are associated with and dependent on the frequency slots for the third optical signal 354.

Note that the frequency dependent map may not associate or indicate a dependency between the frequency slot for the first optical signal 350 (i.e. the first frequency slot 320 between the first and second optical nodes 310, 312) and the frequency slots for the third and fourth optical signals 354, 356 because the frequency slot for the first optical signal 350 did not directly affect or cause the frequency slots for the third and fourth optical signals 354, 356 to be separated from the selected frequency slot.

The optical network 300 may support more optical signals than those illustrated in FIG. 3A. For example, if an additional optical signal was transmitted along the optical network 300 between the first and second optical nodes 310, 312 using two frequency slots, the additional optical signal may be assigned to the second and third frequency slots 322, 324. The frequency slot dependency map may be updated to reflect a dependency between the frequency slots of the additional optical signal and the frequency slot of the first optical signal 350. In some embodiments, the frequency slots of an optical signal may be dependent on more than one grouping of frequency slots. For example, the additional optical signal may have an optical bandwidth requirement of four frequency slots. In these and other embodiments, the frequency slot dependency map may be updated to reflect a dependency between the frequency slots of the additional optical signal and the frequency slots of the first optical signal 350 as well as a dependency between the frequency slots of the additional optical signal and the frequency slots of the fourth optical signal 356.

The optical signals 350, 352, 354, 356 may not be maintained indefinitely on the optical network 300. The optical network 300 may be dynamic and the optical signals 350, 352, 354, 356 may be supported by the optical network 300 for a period and then dropped from the optical network 300. The dropping of one or more optical signals from the optical network 300 may be referred to as an optical signal departure event. An optical signal may be dropped from the optical network 300 when a client signal for an optical signal is terminated, a holding time for the optical signal expires, or for other reasons. FIG. 3B illustrates the optical network 300 after an optical signal departure resulting in the dropping of the second optical signal 352 from the optical network 300. Thus, only the first, third, and fourth optical signals 350, 354, 356 are illustrated in FIG. 3B.

Dropping an optical signal from the optical network 300 may result in the release of the frequency slots occupied by the optical signal. The release of frequency slots may indicate that the frequency slots are available to support another optical signal. For example, dropping the second optical signal 352 may result in the release of the first, second, and third frequency slots 320, 322, 324 between the third and fourth optical nodes 314, 316.

An optical signal departure event and the release of frequency slots may cause fragmentation of the optical spectrum 302 of the optical network 300. For example, as illustrated in FIG. 3B, the optical spectrum 302 has six open frequency slots between the second and fourth optical nodes 312, 316. However, the six open frequency slots are not contiguous frequency slots, but divided into two groups of three frequency slots. Thus, an optical signal with a bandwidth requirement of four to six frequency slots would be blocked from being transmitted between the second and fourth optical nodes 312, 316 because there are not four contiguous frequency slots between the second and fourth optical nodes 312, 316.

FIG. 3C illustrates the defragmentation of the optical spectrum 302 of the optical network 300. The optical spectrum 302 may be defragmented by reassigning the optical signals 354, 356 to different frequency slots based on the frequency slot dependency map.

After an optical signal departure event, the frequency slot dependency map may be used to determine the frequency slots of one or more optical signals that depended on the frequency slots of the dropped optical signal. Based on this information, the optical signals may be reassigned to the frequency slots released from the departure of the dropped optical signal. In some embodiments, the optical signals may be reassigned to the frequency slots automatically after the optical signal departure event. In these and other embodiments, the optical signals may be reassigned to the frequency slots after some period of time or immediately following the optical signal departure event. In some embodiments, the optical signals may be reassigned to the frequency slots manually after the optical signal departure event. In some embodiments, the reassigned optical signals may be reassigned to the frequency slots released from the departure of the dropped optical signal with little or no service interruption.

For example, in FIGS. 3A-3C, the frequency slots of the third optical signal 354 were associated with and depended on the frequency slots of the dropped second optical signal 352. Based on this information, the third optical signal 354 may be reassigned to the frequency slots released from the departure of the second optical signal 352. For example, as illustrated in FIG. 3C, the third optical signal 354 may be reassigned to the first and second frequency slots 320, 322 that were released from the departure of the second optical signal 352.

The frequency dependency map may also be used to determine the frequency slots of optical signals that are associated with or depend on the frequency slots of an optical signal that is reassigned as a result of the dropped optical signal. Based on this information, the optical signals may be reassigned to the released frequency slots of one or more optical signals that are reassigned. In some embodiments, the optical signals may be reassigned to the released frequency slots with little or no service interruption.

For example, in FIGS. 3A-3C, the frequency slots of the fourth optical signal 356 were associated with and depended on the frequency slots of the reassigned third optical signal 354. Based on this information, the fourth optical signal 356 may be reassigned to the frequency slots released from the departure of the second and/or third optical signals 352, 354. For example, as illustrated in FIG. 3C, the fourth optical signal 356 may be reassigned to the third and fourth frequency slots 324, 326 that were released from the departure of the second and third optical signals 352, 354.

The frequency dependency map may thus be used to determine some or all of the optical signals that may be reassigned based on the release of the frequency slots of the dropped optical signal. In some embodiments, after defragmentation, the reassigned optical signals may have frequencies slots closer to the selected frequency slot (i.e. the first frequency slot 320) than the previously assigned frequency slots.

The reassignment of optical signals may result in some defragmentation of the optical spectrum 302 of the optical network 300. For example, as illustrated in FIG. 3C, the reassignment of the third and fourth optical signals 354, 356 may result in some defragmentation of the optical spectrum 302. After the defragmentation, a fifth optical signal 358 between the second and third optical nodes 312, 314 may be supported by the optical network 300. The fifth optical signal 358 may have a bandwidth requirement of four frequency slots and may be assigned to the fifth, sixth, seventh, and eighth frequency slots 328, 330, 332, 334. Before the defragmentation of the optical spectrum 302, the fifth optical signal 358 would not have been supported by the optical network 300. After defragmentation, the optical network 300 may support the fifth optical signal 358 and an additional optical signal with a bandwidth requirement of up to two frequency slots between the second and third optical nodes 312, 314.

In some embodiments, the optical signals to be reassigned may be reassigned in a sequential order starting with the optical signal adjacent to the optical signal that was dropped from the optical network 300. For example, the third optical signal 354 may be reassigned. After the reassignment of the third optical signal 354, the fourth optical signal 356 may be reassigned. Alternately or additionally, the optical signals to be reassigned may be reassigned at substantially the same time. For example, the third optical signal 354 may be reassigned as the fourth optical signal 356 is reassigned. In these and other embodiments, the reassignment of the fourth optical signal 356 may commence after the reassignment of the third optical signal 354 has begun but some portion of the time during which the third and fourth optical signals 354, 356 are reassigned may overlap.

After or during the reassignment of the optical signals, the frequency slot dependency map may be updated to account for newly formed dependencies and to remove dependencies that may no longer exist. For example, the dependency between the frequency slots of the second optical signal 352 and the frequency slots of the third optical signal 354 may be removed because the second optical signal 352 is dropped from the optical network. As another example, if the third optical signal 354 is dropped from the optical network 300, the frequency slots of the fourth optical signal 354 may be reassigned to the second and third frequency slots 322, 324 between the first and third optical nodes 310, 314. In these and other embodiments, the frequency slot dependency map may be updated to reflect a dependency between the frequency slots of the fourth optical signal 354 and the frequency slots of the first optical signal 350.

In some embodiments, the selected frequency slot may be in a location other than the first frequency slot 320. For example, the selected frequency slot may be the tenth frequency slot 338 or one of the other frequency slots. Alternately or additionally, the optical spectrum 302 may be divided and have two or more selected frequency slots. In these and other embodiments, each portion of the optical spectrum may be have its own frequency slot dependency map and may be defragmented independently. In some embodiments, the optical network 300 may be a flexible grid optical network or a fixed grid optical network.

Figure 4:
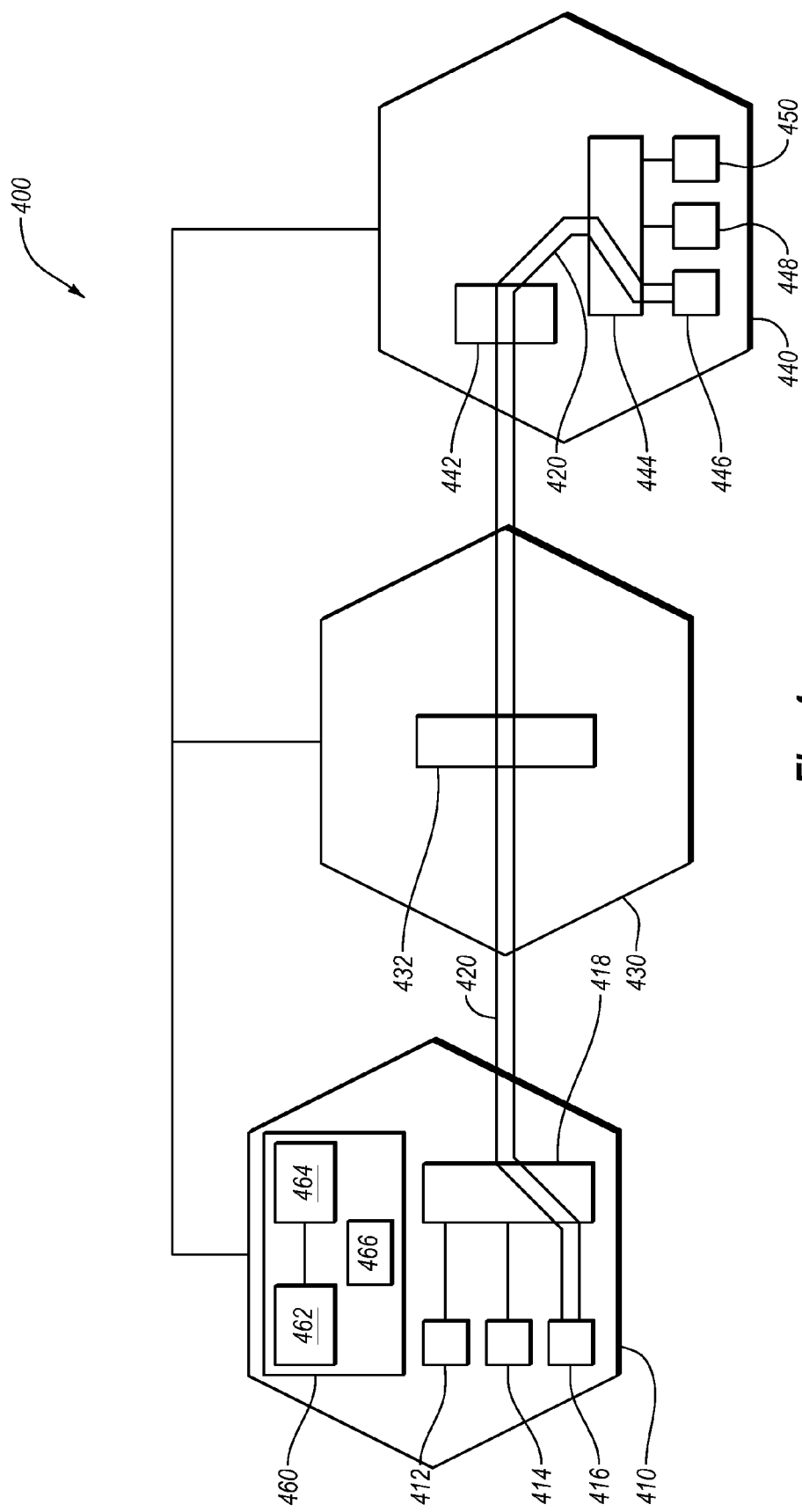
FIG. 4 is a block diagram of an example optical network configured to defragment an optical spectrum of the optical network.

FIG. 4 is a block diagram of an example optical network 400 configured to defragment an optical spectrum of the optical network 400, arranged in accordance with at least some embodiments described herein. The optical network 400 may include a source optical node 410, an intermediate optical node 430, and a destination optical node 440.

The source optical node 410 may be configured to generate an optical signal 420 from an electrical signal and to transmit the optical signal 420. The source optical node 410 may include first, second, and third transponders 412, 414, 416 that are configured to generate optical signals. FIG. 4 illustrates the third transponder 416 generating the optical signal 420. The source optical node 410 may also include a WSS 418 that may be configured to transmit the optical signal 420 to the intermediate optical node 430.

The intermediate optical node 430 may include a WSS 432 that may be configured to transmit the optical signal 420 to the destination optical node 440. The destination optical node 440 may be configured to receive and convert the optical signal 420 to an electrical signal. The destination optical node 440 may include a splitter 442 to direct the optical signal 420 to a WSS 444. The WSS 444 may direct the optical signal 420 to a first transponder 446 configured to convert the optical signal 420 to an electrical signal. The destination optical node 440 may also include one or more other transponders, such as a second and third transponder 448, 450.

The source optical node 410 may further include a frequency slot map unit 462 configured to generate a frequency slot map indicating the dependency between adjacent groups of frequency slots within the optical network 400 that are occupied by an optical signal support by the optical network 400. The frequency slot map unit 462 may be configured to generate a frequency slot map following the principles described herein.

The source optical node 410 may further include a frequency slot assignment unit 464 configured to generate a signal, based on the frequency slot map generated by the frequency slot map unit 462. The signal may indicate the frequency slots to which the optical signal 420 may be reassigned within the optical network 400 when an optical signal departure event is detected. The frequency slot assignment unit 464 may send the signal to various components within the source optical node 410. The frequency slot assignment unit 464 may also send the signal to the other optical nodes 430, 440 for distribution among the components within the other optical nodes 430, 440.

For example, the frequency slot assignment unit 464 may detect an optical signal departure event, such as a dropped optical signal caused by, for example, the transponder 414 terminating transmission of the dropped optical signal to the destination node 440. The frequency slot assignment unit 464 may determine if the frequency slots of the optical signal 420 depend on or are associated with the frequency slots of the dropped optical signal or if the frequency slots of the optical signal 420 are within a chain of dependent frequency slots starting from the frequency slots of the dropped optical signal, based on the frequency slot map generated by the frequency slot map unit 462. If the frequency slots of the optical signal 420 depend from or are associated with the frequency slots of the dropped optical signal directly or through a chain of dependent frequency slots, the frequency slot assignment unit 464 may determine the frequency slots to which the optical signal 420 may be reassigned. The frequency slot assignment unit 464 may send a signal that includes the optical signal reassignment information to the components within the first optical node 410 as well as to the other optical nodes 430, 440. In some embodiments, the signal may include additional information to coordinate the reassignment of the optical signal 420, such as when to reassign the optical signal 420.

To reassign the optical signal 420, the optical network 400 may be configured to continuously tune a carrier wavelength of the optical signal 420 from a central wavelength of the frequency slots to a central wavelength of the reassigned frequency slots. By continuously tuning the carrier wavelength of the optical signal 420, the optical signal may be uninterrupted when the optical signal 420 is reassigned frequency slots. By not interrupting the optical signal 420, a reduced amount or no service interruption of data transmitted along the optical signal 420 may occur.

In some embodiments, to reassign the carrier wavelength of the optical signal 420 to the central wavelength of the reassigned frequency slots, the source optical node 410 may be configured to tune the carrier wavelength of the optical signal 420 according to a continuous function. More specifically, the transponder 416 within the source optical node 410 may be configured to tune the carrier wavelength of the optical signal 420 according to a continuous function using a tunable laser. Tuning the carrier wavelength of the optical signal 420 according to a continuous function may cause the carrier wavelength of the optical signal 420 to traverse the wavelength range between the central wavelength of the frequency slots to the central wavelength of the reassigned frequency slots.

As the carrier wavelength of the optical signal 420 is tuned, the WSS 418 within the source node, the WSS 432 within the intermediate optical node 430, and the WSS 444 within the destination optical node 440 may tune their corresponding pass-through bandwidths in a coordinated fashion with the tuning of the optical signal 420 to allow the optical signal 420 to pass to the transponder 446 without attenuating or blocking the optical signal 420. The WSS 418, the WSS 432, and the WSS 444 may tune their pass-through bandwidths based on the signal received from the frequency slot assignment unit 464, for example.

Furthermore, as the carrier wavelength of the optical signal 420 is tuned, the transponder 446 may include a coherent receiver that may include a reference optical signal used to demodulate the optical signal 420 that is being tuned in a coordinated fashion with the optical signal 420 based on the signal received from the frequency slot assignment unit 464.

The optical network 400 illustrated by FIG. 4 is provided by way of example only. In some embodiments, the optical network 400 may include more optical nodes and may be supporting other optical signals besides the optical signal 420. Furthermore, in some embodiments, the optical nodes 410, 430, 440 may each function as a source optical node, pass-through optical node, or destination optical node for one or more optical signals.

In some embodiments, the frequency slot map unit 462 and the frequency slot assignment unit 464 may be part of another optical node within the optical network 400 besides the source optical node 410.

In some embodiments, the frequency slot map unit 462 and the frequency slot assignment unit 464 may be part of a control unit 460 that may include a processor 466 for performing operations to control the defragmentation of the optical network 400 based on input from the optical network 400, the frequency slot map unit 462, and the frequency slot assignment unit 464.

In some embodiments, the frequency slot map unit 462 and the frequency slot assignment unit 464 may be part of a control system that is separate from each of the optical nodes within the optical network 400. In these and other embodiments, the control system may communicate with the optical nodes to receive information for the frequency slot map unit 462 and the frequency slot assignment unit 464. For example, the control system may receive information that may be used by the frequency slot map unit 462 to construct a frequency slot map. Alternately or additionally, the control system may receive information regarding an optical signal departure event that may be used by the frequency slot assignment unit 464.

Figure 5:
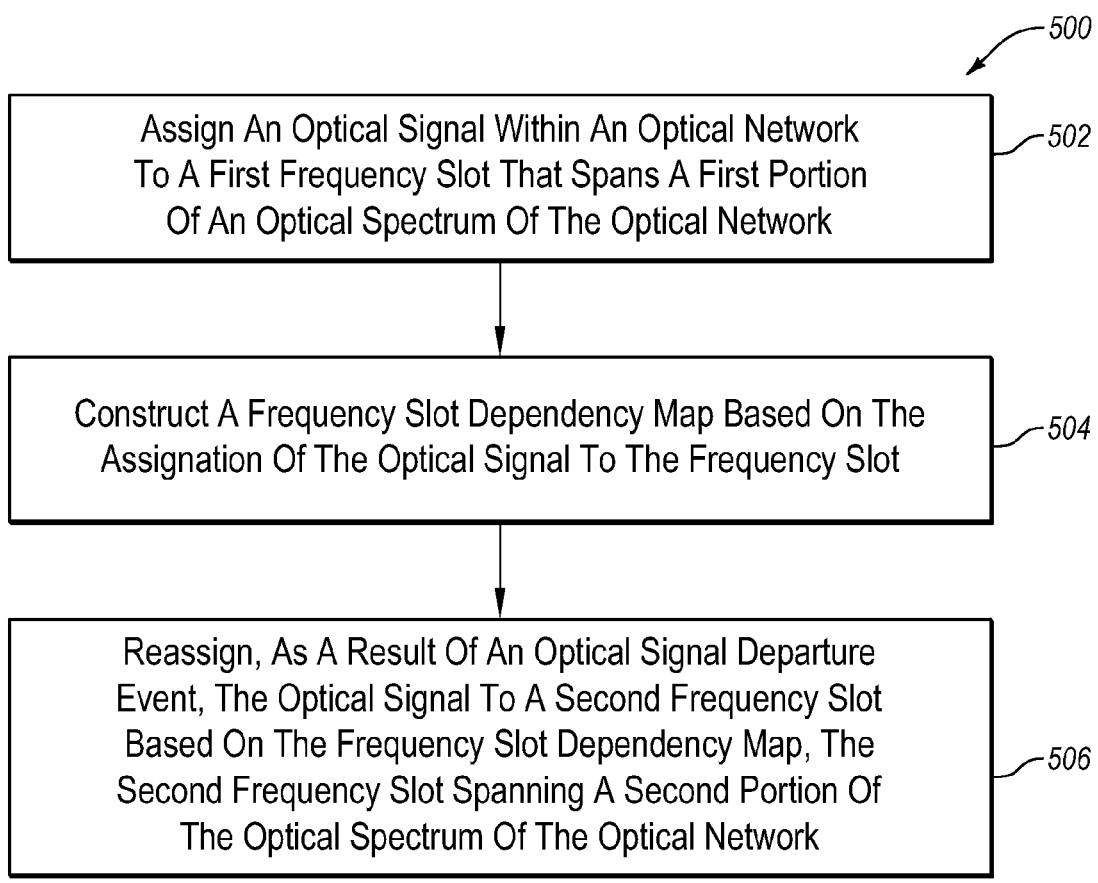
FIG. 5 is a flow chart of an example method of spectrum defragmentation in an optical network.

FIG. 5 is a flow chart of an example method 500 of spectrum defragmentation in an optical network, arranged in accordance with at least some embodiments described herein. The method 500 may be implemented, in some embodiments, by an optical network, such as the optical network 400 that includes components configured to defragment a spectrum of the optical network 400 of FIG. 4. For instance, the processor 466 within the control unit 460 of one of the optical nodes of the optical network 400 of FIG. 4 may be configured to execute computer instructions to perform operations for defragmenting an optical network as represented by one or more of blocks 502, 504, and/or 506 of the method 500. Although illustrated as discrete blocks, various blocks may be divided into additional blocks, combined into fewer blocks, or eliminated, depending on the desired implementation.

The method 500 may being at block 502, in which an optical signal within an optical network may be assigned to a first frequency slot that spans a first portion of an optical spectrum of the optical network.

In some embodiments, assigning the optical signal to the first frequency slot may include selecting an unoccupied frequency slot closest to a selected frequency slot within the optical spectrum as the first frequency slot. For example, in some embodiments, a frequency slot with the lowest frequency in the optical spectrum may be selected as the selected frequency slot. The optical signal may be assigned to a frequency slot that is closest to the selected frequency slot, meaning that the optical signal is assigned to a frequency slot with frequencies relatively closer to the frequencies of the selected frequency slot than other frequency slots. In some embodiments, the optical signal may be assigned to more than one frequency slot. For example, the optical signal may be assigned to multiple contiguous frequency slots, spanning from a source to a destination of the optical signal and that includes the first frequency slot, to meet the optical bandwidth requirements of the optical signal.

In block 504, a frequency slot dependency map may be constructed based on the assignment of the optical signal to the first frequency slot. In some embodiments, the frequency slot dependency map may be constructed to associate the first frequency slot to an adjacent frequency slot when the adjacent frequency slot causes the first frequency slot to be separated from the selected frequency slot by one or more frequency slots.

In block 506, the optical signal may be reassigned to a second frequency slot, as a result of an optical signal departure event, based on the frequency slot dependency map; the second frequency slot may span a second portion of the optical spectrum of the optical network. The second frequency slot may be positioned so that the first optical bandwidth between the first frequency slot and the selected frequency slot is larger than a second optical bandwidth between the second frequency slot and the selected frequency slot.

In some embodiments, the optical signal may be reassigned to the second frequency slot as a result of the optical signal departure because the optical signal departure event released a portion of the optical spectrum of the optical network. With the release of the portion of the optical spectrum, the optical signal may be reassigned to another frequency slot, such as the second frequency slot. In some embodiments, when the optical signal is reassigned to the second frequency slot may be based on the optical signal departure event. Alternately or additionally, when the optical signal is reassigned to the second frequency slot may be based on a triggering event. In some embodiments, the triggering event may be the optical signal departure event or multiple optical signal departure events. Alternately or additionally, the triggering event may be the optical network beginning to support one or more additional optical signals. Alternately or additionally, the triggering event may be the optical spectrum of the optical network reaching and/or exceeding a fragmentation measurement threshold. In some embodiments, the method 500 may be performed automatically after a triggering event without manual intervention. Alternately or additionally, the method 500 may be performed manually in an ad-hoc or periodic fashion.

In some embodiments, the optical signal departure event may include the optical network dropping an optical signal supported by the optical network other than the optical signal assigned to the first frequency slot. In some embodiments, the optical signal departure event may include the optical network dropping more than one optical signal supported by the optical network. For example, the optical signal departure event may include the optical network dropping a group of optical signals. In some embodiments, the first and second frequency slots may have equal optical bandwidths or the optical bandwidths of the first and second frequency slots may vary. In some embodiments, only a portion of the optical spectrum of the optical network may be divided into frequency slots.

In some embodiments, reassigning the optical signal to the second frequency slot may include continuously tuning a carrier wavelength of the optical signal so that transmission of the optical signal is uninterrupted while the optical signal is being reassigned to the second frequency slot. Continuously tuning the carrier wavelength of the optical signal may result in limited or no signal interruption of the optical signal as the optical signal is reassigned to the second frequency slot.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

For instance, the method 500 may further include updating the frequency slot dependency map based on the reassignment of the optical signal to the second frequency slot. In some embodiments, updating the frequency slot dependency map may include eliminating associations between the first and second frequency slots and/or eliminating associations between the first and/or second frequency slots and other frequency slots in the optical spectrum. Alternately or additionally, updating the frequency slot dependency map may include adding associations between the first and second frequency slots and/or adding associations between the first and/or second frequency slots and other frequency slots in the optical spectrum.

In some embodiments, the method 500 may further include reassigning, as a result of the optical signal departure event, another optical signal to a third frequency slot based on the frequency slot dependency map. In these and other embodiments, the reassignment of the another optical signal to the third frequency slot may occur at substantially the same time as the reassignment of the optical signal to the second frequency slot. Alternately, the reassignment of the another optical signal to the third frequency slot may occur after or before the reassignment of the optical signal to the second frequency slot.

Figure 6:
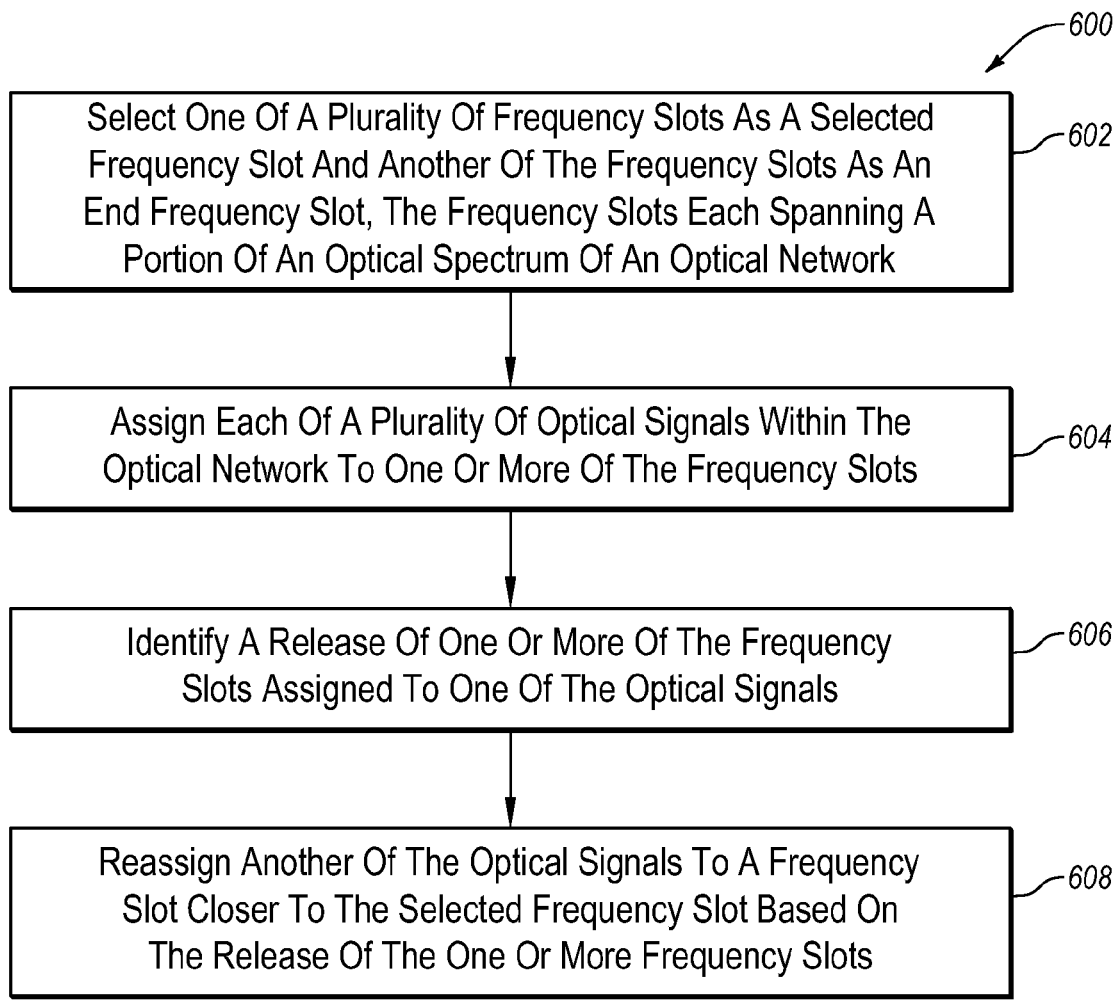
FIG. 6 is a flow chart of another example method of spectrum defragmentation in an optical network, all arranged in accordance with at least some embodiments described herein.

FIG. 6 is a flow chart of an example method 600 of spectrum defragmentation in an optical network, arranged in accordance with at least some embodiments described herein. The method 600 may be implemented, in some embodiments, by an optical network, such as the optical network 400 that includes components configured to defragment a spectrum of the optical network 400 of FIG. 4. For instance, the processor 466 within the control unit 460 of one of the optical nodes of the optical network 400 of FIG. 4 may be configured to execute computer instructions to perform operations for defragmenting an optical network as represented by one or more of blocks 602, 604, 606, and/or 608 of the method 600. Although illustrated as discrete blocks, various blocks may be divided into additional blocks, combined into fewer blocks, or eliminated, depending on the desired implementation.

The method 600 may being at block 602, in which one of multiple frequency slots may be selected as a selected frequency slot and another of the frequency slots as an end frequency slot. The frequency slots may each span a portion of an optical spectrum of an optical network. Each of the frequency slots may have equal optical bandwidths or the optical bandwidths of the frequency slots may vary. In some embodiments, only a portion of the optical spectrum of the optical network may be divided into frequency slots.

In block 604, each of multiple optical signals within the optical network may be assigned to one or more of the frequency slots. In some embodiments, assigning each of the multiple optical signals within the optical network to frequency slots may include assigning each of the multiple optical signals to the one or more frequency slots closest to the selected frequency slot. For example, in some embodiments, a frequency slot with the lowest frequency may be selected as the selected frequency slot. An optical signal may be assigned to frequency slots that are closest to the selected frequency slot, meaning that the optical signal is assigned to frequency slots with frequencies closest to the frequencies of the selected frequency slot. Furthermore, each optical signal may be assigned to enough contiguous frequency slots, spanning from a source to a destination of the optical signal, to meet the optical bandwidth requirements of the optical signal.

In block 606, a release of one or more of the frequency slots from use in the optical network may be identified. The release of one or more of the frequency slots may occur as a result of an optical signal departure event, such as when an optical signal is dropped from the optical network. Alternately or additionally, the release of one or more of the frequency slots may occur as a result of the frequency slots of an optical signal being reassigned to other frequency slots.

In block 608, another of the optical signals may be reassigned to at least one frequency slot closer to the selected frequency slot based on the release of the one or more frequency slots. The another optical signal that is reassigned to the frequency slot closer to the selected frequency slot may have been initially assigned to a frequency slot between the released frequency slots and the end frequency slot.

In some embodiments, when the another of the optical signals may be reassigned to the at least one frequency slot closer to the selected frequency slot may be based on a triggering event. In some embodiments, the triggering event may be the release of the one or more of the frequency slots from use in the optical network. Alternately or additionally, the triggering event may be the optical network beginning to support one or more additional optical signals. Alternately or additionally, the triggering event may be the optical spectrum of the optical network reaching and/or exceeding a fragmentation measurement threshold. In some embodiments, the method 600 may be performed automatically after a triggering event without manual intervention. Alternately or additionally, the method 600 may be performed manually in an ad-hoc or periodic fashion.

Reassigning the another of the optical signals to the frequency slot closer to the selected frequency slot may include continuously tuning a carrier wavelength of the optical signal so that transmission of the optical signal is uninterrupted while the frequency slot of the optical signal is reassigned. In some embodiments, the frequency slot closer to the selected frequency slot is between the released frequency slots and the end frequency slot.

In some embodiments, the method 600 may further include constructing a frequency slot dependency map based on the assignation of each of the optical signals to the one or more of the frequency slots. In some embodiments, the frequency slot dependency map may be constructed to associate frequency slots occupied by one of the optical signals in the optical network to adjacent frequency slots occupied by another of the optical signals when the frequency slots selected for the one of the optical signals is further from the selected frequency slot as a result of the adjacent frequency slots being occupied by the another of the optical signals. In these and other embodiments, reassigning the frequency slots of the optical signals may be based on the constructed frequency slot dependency map.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data that cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. One or more non-transitory computer-readable media having instructions stored thereon that, responsive to execution by one or more processors, cause the one or more processors to perform operations to defragment an optical network, the operations comprising:
    selecting one of a plurality of frequency slots as a selected frequency slot and another of the frequency slots as an end frequency slot, the frequency slots each spanning a portion of an optical spectrum of an optical network;
    assigning each of a plurality of optical signals within the optical network to one or more of the frequency slots;
    constructing a frequency slot dependency map based on the assignation of the optical signals to their respective frequency slots, wherein
        a first optical signal of the plurality of optical signals that is assigned to a first set of the frequency slots is associated with a second optical signal of the plurality of optical signals that is assigned to a second set of the frequency slots based on the second set of the frequency slots being between the first set of the frequency slots and the selected frequency slot such that the second optical signal prevents the first optical signal from occupying the second set of the frequency slots, and
        a third optical signal of the plurality of optical signals that is assigned to a third set of the frequency slots is associated with the first optical signal based on the first set of the frequency slots being between the third set of the frequency slots and the selected frequency slot such that the first optical signal prevents the third optical signal from occupying the first set of the frequency slots;

identifying a release of the second optical signal; and in response to the release of the second optical signal, reassigning the first optical signal associated with the released second optical signal to one or more of the frequency slots of the second set of the frequency slots based on the association of the first and second optical signals in the frequency slot dependency map.

2. The non-transitory computer-readable media of claim 1, wherein the reassigning the first optical signal comprises continuously tuning a carrier wavelength of the first optical signal so that transmission of the first optical signal is uninterrupted while reassigning the first optical signal.

3. The non-transitory computer-readable media of claim 1, wherein each of the plurality of optical signals within the optical network are assigned to one or more of the frequency slots that are available and that are closest to the selected frequency slot.

4. The non-transitory computer-readable media of claim 1, wherein the frequency slot dependency map is constructed while each of the plurality of optical signals are assigned to the one or more of the frequency slots.

5. The non-transitory computer-readable media of claim 1, wherein the associations between the optical signals in the frequency slot dependency map are updated after reassigning the first optical signal associated with the released second optical signal.

6. One or more non-transitory computer-readable media having instructions stored thereon that, responsive to execution by one or more processors, cause the one or more processors to perform operations to defragment an optical network, the operations comprising:

assigning a first optical signal to a first frequency slot;

assigning a second optical signal to a second frequency slot;

associating the second frequency slot with the first frequency slot based on the first frequency slot being between the second frequency slot and a selected frequency slot such that the second optical signal is prevented from occupying the first frequency slot;

assigning a third optical signal to a third frequency slot;

associating the third frequency slot with the second frequency slot in a frequency slot dependency map based on the second frequency slot being between the third frequency slot and the selected frequency slot such that the third optical signal is prevented from occupying the second frequency slot;

detecting an optical signal departure event; and reassigning, in response to the optical signal departure event, the second optical signal to the first frequency slot and the third optical signal to the second frequency slot.

7. The non-transitory computer-readable media of claim 6, wherein the assigning the first optical signal comprises selecting an unoccupied frequency slot closest to the selected frequency slot within an optical spectrum as the first frequency slot.

8. The non-transitory computer-readable media of claim 6, wherein a first optical bandwidth between the first frequency slot and the selected frequency slot is larger than a second optical bandwidth between the second frequency slot and the first frequency slot.

9. The non-transitory computer-readable media of claim 6, wherein the second frequency slot is released from being assigned to the second optical signal before being reassigned to the third optical signal as a result of the optical signal departure event.

10. The non-transitory computer-readable media of claim 6, wherein the operations further comprise updating the frequency slot dependency map based on the reassignment of the second optical signal to the first frequency slot and the third optical signal to the second frequency slot.

11. The non-transitory computer-readable media of claim 6, wherein the optical signal departure event comprises the optical network dropping another optical signal.

12. The non-transitory computer-readable media of claim 6, wherein the reassignment of the second optical signal to the first frequency slot occurs at substantially the same time as the reassignment of the third optical signal to the second frequency slot.

13. The non-transitory computer-readable media of claim 6, wherein the reassigning the second optical signal to the first frequency slot comprises continuously tuning a carrier wavelength of the second optical signal so that transmission of the second optical signal is uninterrupted while the second optical signal is reassigned to the first frequency slot.

14. The non-transitory computer-readable media of claim 6, wherein the second optical signal and the third optical signal are reassigned in response to the optical signal departure event regardless of an optical fragmentation of the optical network.

15. The non-transitory computer-readable media of claim 6, wherein the optical signal departure event comprises the optical network dropping the first optical signal.

16. A system for defragmenting a spectrum of an optical network, the system comprising:

a frequency slot map unit configured to generate a frequency slot map indicating a dependency between at least three continuously adjacent groups of frequency slots within an optical network, each continuously adjacent group of the frequency slots comprising one or more frequency slots and being assigned to an optical signal supported by the optical network, the dependency between directly adjacent groups of frequency slots in the at least three continuously adjacent groups of frequency slots being based on a first group of frequency slots of the directly adjacent groups of frequency slots being positioned further from a selected frequency slot as a result of a second group of frequency slots of the directly adjacent groups of frequency slots that is adjacent to the first group of frequency slots being nearer to the selected frequency slot such that a first optical signal assigned to the first group of frequency slots is prevented from occupying one or more frequency slots in the second group of frequency slots due to a second optical signal assigned to the second group of frequency slots; and a frequency slot assignment unit configured to generate a signal based on the frequency slot map when an optical signal departure event is detected, the signal indicating reassignment of the frequency slots for one or more of the optical signals within the optical network based on dependencies between the continuously adjacent groups of frequency slots in the frequency slot map.

17. The system of claim 16, wherein the frequency slot map unit is further configured to update the frequency slot map based on the signal generated by the frequency slot assignment unit.

18. The system of claim 16, wherein the frequency slot assignment unit is further configured to send the signal to one or more optical nodes.

19. An optical node within the optical network of claim 16, the optical node comprising the frequency slot map unit and the frequency slot assignment unit.

* * * * *